July 25, 1950 G. M. MAGRUM ET AL 2,516,781
HYDRAULIC SHOCK ABSORBER STRUCTURE
Filed March 5, 1945 2 Sheets-Sheet 1
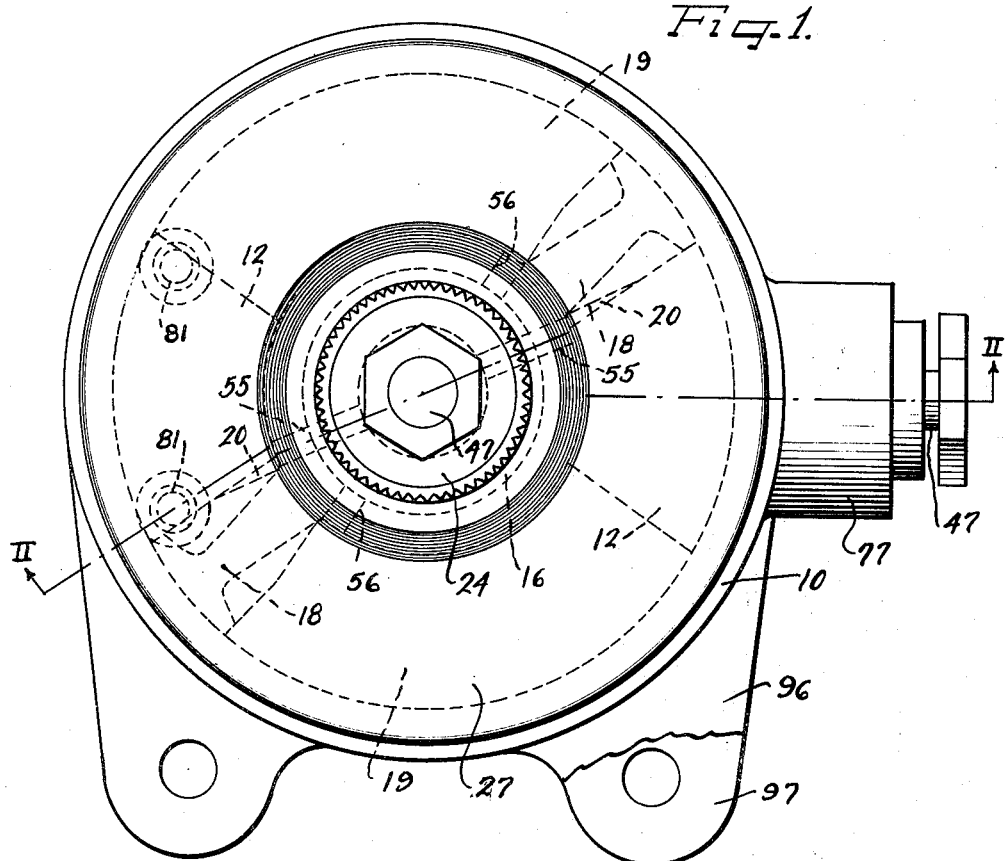
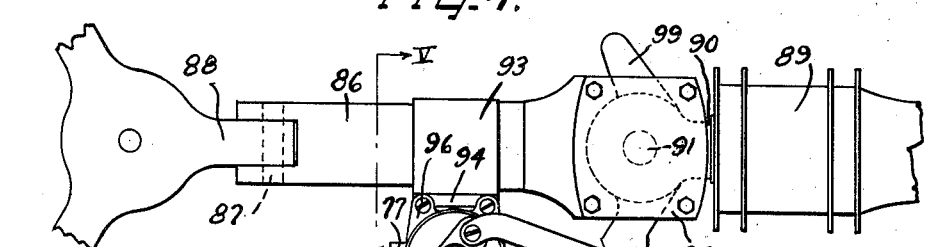
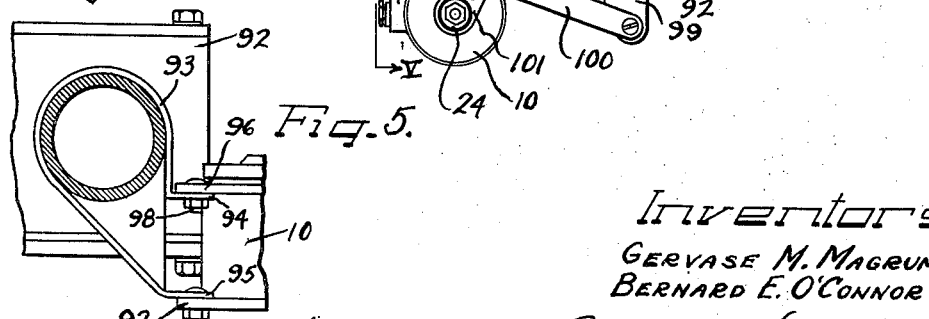
Inventors
GERVASE M. MAGRUM
BERNARD E. O'CONNOR July 25, 1950 G. M. MAGRUM ET AL 2,516,781
HYDRAULIC SHOCK ABSORBER STRUCTURE
Filed March 5, 1945 2 Sheets-Sheet 2

Inventors
GERVASE M. MAGRUM
BERNARD E. O'CONNOR

Patented July 25, 1950

2,516,781

UNITED STATES PATENT OFFICE 2,516,781

HYDRAULIC SHOCK ABSORBER STRUCTURE

Gervase M. Magrum and Bernard E. O'Connor, Buffalo, N. Y., assignors to Houdaille-Hershey Corporation, Detroit, Mich., a corporation of Michigan Application March 5, 1945, Serial No. 581,094

8 Claims. (Cl. 188—93)

This invention relates to an improved hydraulic shock absorber of the rotary type adapted for general use but designed more particularly for use in structures such as helicopters for damping and controlling various movements of the wings extending from the driving head or hub of the wing structure. When in such service, a shock absorber must function to provide a predetermined hydraulic flow resistance for damping normal movements or vibrations of the wings, and must also function to provide for quick release or blow-off of hydraulic pressure under abrupt or sudden service movements of the wings, so as to prevent undue straining thereof.

An important object of the invention is therefore to produce a hydraulic shock absorber in which valve means are provided to be readily adjustable for controlling the hydraulic flow resistance for normal operation of the shock absorber, and relief or blow-off valve structures adjustable independently of the normal flow-controlling valve structure, to function under abnormal operating conditions to momentarily reduce the resistance to hydraulic flow until normal operating conditions again prevail.

Another object of the invention is to provide blow-off valve structures located within the bore of the piston structure and adjustable from the exterior of the shock absorber to respond to predetermined excess or abnormal pressure differential between hydraulic working chambers of the shock absorber for relief of the pressure, and to provide other valve structure adjustable from the exterior of the shock absorber for metering the flow of displaced hydraulic fluid for normal operation of the shock absorber when the blow-off valve structure is closed.

A further object is to provide a flow passageway through one of the abutments in the shock absorber between which the vanes on the piston structure operate, and to control such flow passageway by valve structure extending into the abutment and adjustable from the outside of the shock absorber.

Another object is to adapt the shock absorber structure for ready and efficient mounting in service position as, for example, in helicopters, for controlling wing operation.

The above referred to and other objects and features of the present invention are embodied in the structure shown on the accompanying drawings, in which drawings:

Figure 1 is a plan view of the shock absorber;

Figure 4 is a plan view of the inner portion of a helicopter wing structure and the driving head or hub therefor, and showing the application of our improved shock absorber for damping horizontal swing of the wing blade; and Figure 5 is a section on plane V—V of Figure 4.

Figure 2:
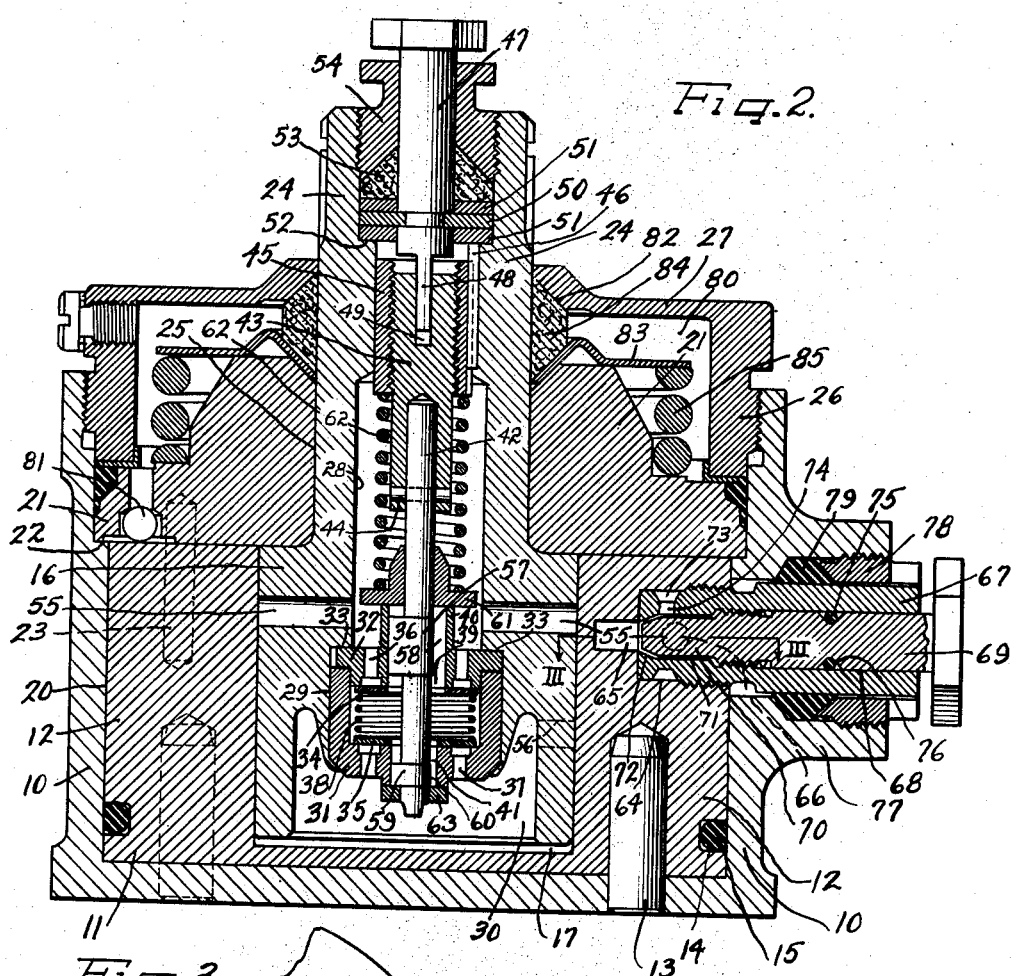
Figure 2 is a section on plane II—II of Figure 1.
Figure 3:
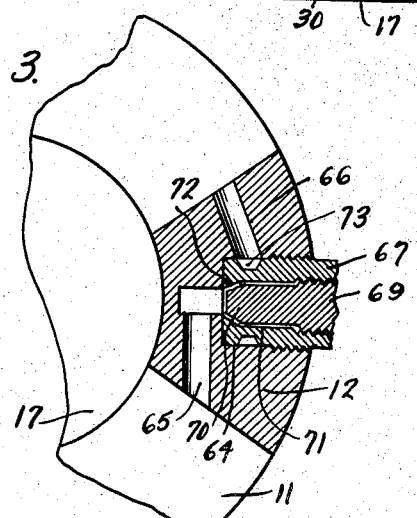
Figure 3 is a section on plane III—III of Figure 2.

The cylinder 10 of the shock absorber is in the form of a cylindrical cup, preferably of light metal such as aluminum alloy. Seated within the cylinder is the abutment structure comprising the cylindrical base 11 from which extend the abutment flanges 12. This abutment structure is preferably of non-metallic material, as, for example, phenolic plastic. The abutment structure is held against rotation in the cylinder by dowels 13. The base 11 has the circumferential channel 14 for reception of a sealing ring 15 of suitable material for preventing leakage between the base and the cylinder walls.

The piston structure comprises a hub 16 extending through the cylinder between the abutment flanges 12 for bearing engagement therewith, the lower end of the hub extending into the cylindrical bearing recess 17 in the base 11 of the abutment structure. Extending from the piston hub are the wings or vanes 18 for bearing engagement at their outer ends with the cylinder wall. The piston hub, together with the abutment flanges and the vanes, define the pairs of hydraulic pressure chambers 19 and 20. The abutment structure base 11 forms the lower wall for these chambers, the outer closure wall 21 for these chambers engaging into the end of the cylinder for abutting the ends of the abutment flanges 12 and the annular shoulder 22 of the cylinder wall, the wall 21 being held against rotation of the cylinder by dowels 23 seated in the abutment flanges. The piston shaft 24 extending from the piston hub has bearing in the opening 25 through the end wall 21. A clamping ring 26 threads into the outer end of the cylinder for clamping the end wall 21 in service position, the ring 26 having an annular flange 27 extending at right angles from its outer end for surrounding the piston shaft. The end wall 21, like the abutment flange structure, is preferably of non-metallic material such as phenolic plastic, while the clamping ring structure is preferably of some light metal such as aluminum alloy.

The piston shaft has the bore 28 communicating with a bore 29 of larger diameter in the piston hub, and in the inner end of the piston hub is the large bore 30 forming a fluid flow chamber, Within the bore 29 is a valve housing comprising the cup-shaped body 31 and the cover 32 therefor, this body and cover assembly being secured in the bore 29 to rest against the shoulder 33. Within this valve housing are the valves 34 and 35 in the form of annular disks. Through the cover 32 extend ports 36 and through the bottom of the body 31 extend ports 37. A comparatively light spring 38 interposed between the valve disks 34 and 35 tends to hold the valve disk 34 against the inner side of the cover 32 for closure of the ports 36 and to hold the valve disk 35 against the bottom of the body 31 to close the ports 37.

The cover 32 of the valve housing has a passageway 39 which is extended upwardly through a flange 40 on the cover. The bottom wall of the housing body part 31 has the passageway 41 therethrough. Extending downwardly through the passageways 39 and 41 and through the annular valve disks 34 and 35 is a stem 42 which extends at its upper end into the bore of a cylindrical adjusting head 43 to which the stem is secured as by pin 44. The adjusting head 43 is threaded at its outer end for engagement in the threaded sleeve 45 slidable axially in the piston above the bore 28 but held against rotational movement as by a key 46. Extending into the outer end of the piston shaft is an adjusting stem 47 which terminates at its inner end in a tongue 48 engaging in the slot 49 in the head 43. The stem 47 is held against axial movement by a washer 50 clamped between washers 51 to a shoulder 52, packing and sealing material 53 being interposed between the washer assembly and a plug 54 threading into the outer end of the shaft for holding the washer assembly seated on the shoulder 52. Thus, upon turning of the stem 47, the head 43 will be turned and by its screw-threading connection with the sleeve 45 will shift the sleeve axially. Flow passageways 55 extending through the piston hub 16 connect the hydraulic working chambers 20 with the bottom of the bore 28 in the piston shaft, and flow passageways 56 connect the hydraulic working chambers 19 with the chamber 30 in the lower end of the piston hub.

The valve stem 42 has a cylindrical enlargement or collar 57 thereon fitting in the passageway 39 but slabbed off on one side to leave a flow passageway 58. The stem 42 has at its lower end the enlargement or collar 59 fitting in the passageway 37 but slabbed off to leave a flow passageway 60. Receiving the valve stem 42 for axial movement thereon is the blow-off valve 61 between which and the lower end of the threaded sleeve 45 is the helical spring 62 tending to hold the blow-off valve seated against the outer end of the annular flange 40 surrounding the passageway 39. Secured on the lower end of the valve stem 42 is a blow-off valve disk 63 normally held against the housing body 31 to shut off the passageway 41 by the force of the spring 62 which shifts the sleeve 45 and therewith the stem 42 upwardly, the spring 62 thus functioning to normally hold both blow-off valves seated. By adjusting the sleeve 45 axially, in a manner already explained, the spring 62 may be loaded as desired for control of the blow-off valves.

Under normal operating conditions of the shock absorber, the pressure of the hydraulic fluid displaced from working chambers by the oscillation of the piston structure will be insufficient to open the blow-off valves against the resistance of the spring 62. Upon abnormal or excessive pressure build-up in the working chambers 20 the displaced fluid will flow through the passageways 55, ports 36 and past the lightly spring-resisted valve disk 34 and through the passageway 41 and port 60 against the blow-off valve 63 for opening of this valve against the resistance of spring 62 for momentary comparatively free flow into the working chambers 19 until normal pressure conditions are restored and the spring 62 recloses the blow-off valve 63. Upon abnormal or excessive pressure in the working chambers 19, the displaced fluid will flow through the passageways 56, through the ports 37 for displacement of the valve disk 35 and then through the passageway 39 and the port 58 against the blow-off valve 61 for unseating of this valve for momentary comparatively free flow until the normal pressure conditions are resumed and the spring 62 recloses the valve 61. By relatively dimensioning the flow ports 58 and 60 the blow-off movement for one blow-off valve will require more hydraulic pressure than is required for blow-off movement of the other valve.

Describing now the valving arrangement for metering the hydraulic displacement flow during normal operation of the shock absorber, a radially extending cylindrical recess 64 is provided in the outer side of one of the abutment flanges 12. A passageway 65 extends from the bottom of this recess to one side of the abutment flange and a passageway 66 extends from the recess to the other side of the abutment flange. The recess is threaded for receiving a cylindrical valve seat member 67 which has the bore 68 therethrough for receiving a valve stem 69 terminating in the valve 70, shown as a needle valve, operating in the valve chamber 71. The inner end of the valve chamber provides the valve seat 72 for the valve and is connected with the passageway 65.

At its inner end the valve supporting seat member 67 has the annular channel 73 connected by a passage 74 with the valve chamber 71. Thus, when the valve is open, the flow of displaced hydraulic fluid between the hydraulic working chambers will be through the flow path in the abutment flange. The valve stem 69 has threaded engagement in the housing 67 for setting of the valve relative to its seat for the desired resistance to such flow. A packing ring 75 in the channel 76 in the valve stem will prevent leakage of fluid past the stem to the exterior of the shock absorber.

The valve structure extends outwardly through the annular projection 77 on the cylinder 10 so that the valve may be adjusted from the exterior of the shock absorber. Because the valve assembly must be inserted through the cylinder wall into service position in the abutment flange 12, allowance must be made, in the machining operation on the abutment and the projection 77, for a certain amount of eccentricity. The diameter dimensioning of the boring through the projection 77 is therefore such as to allow sufficient diametral clearance around the valve assembly. As shown, a gland nut 78 is screwed into the outer end of the projection 77 and is of somewhat larger internal diameter than the valve housing 67. Packing 79 is compressed by the gland nut around the housing 67 to prevent leakage past the housing to the exterior of the shock absorber. The valve assembly can thus be readily inserted from the outside through the cylinder structure wall into service position in the abutment flange without straining thereof.

The valve 70 meters the displaced hydraulic fluid flow under normal conditions of operation of the shock absorber, and when the hydraulic pressure in the shock absorber becomes excessive and abnormal the blow-off valve structure will function for momentary relief of the pressure. The metering valve and the blow-off valve structure are adjustable entirely independently of each other, so that any desired adjustment of one may be made without disturbing the adjustment of the other.

A hydraulic fluid reservoir 80 between the end wall 21 and the clamping ring structure 26, 27 is connected with the working chambers through passageways controlled by check valves 81. The clamping ring flange 27 presents a beveled surface 82 between which and a beveled annular retainer ring 83 a sealing ring 84 is held in sealing engagement with the piston shaft by the pressure of a spring 85.

Figures 4 and 5 show the application of our improved shock absorber to the wing structure of a helicopter for damping the horizontal swing of the wing blades. A portion of one blade structure is shown as comprising a yoke member 86 hinged at 87 to the wing structure driving hub or head 88 for vertical swing. The blade structure 89 is supported on a yoke 90 hinged by a pin 91 to the head 92 on the yoke member 86, for horizontal swing of the blade structure. The shock absorber structure is mounted on the yoke structure 86 by means of a strap 93 which may be welded to the yoke member and whose ends 94 and 95 project laterally. The shock absorber cylinder element is provided on one side with upper and lower ears 96 and 97 which are secured to the upper and lower strap ends as by bolts 98. The supporting yoke 90 for the blade structure has arms 99 extending therefrom and from one of these arms a link 100 extends to the lever 101 secured to the outer end of the shock absorber piston shaft 24. Thus the shock absorber will hydraulically control and dampen the horizontal swing or vibration of the blade structure, and each blade of the wing structure may be thus controlled by its own shock absorber. Adjustment of the metering valve and of the blow-off valve structure may be readily separately accomplished from the exterior of the shock absorber for the desired hydraulic control of the blade. Our improved shock absorber can be readily applied for controlling other movements of the wing structures or the movement of control elements for the wing structures and driving means therefor.

We have shown a practical and efficient embodiment of the features of our invention but we do not desire to be limited to the exact construction, arrangement and operation shown and described, as changes and modifications may be made without departing from the scope of the invention as defined by the appended claims.

We claim as our invention:

1. A hydraulic shock absorber structure of the rotary type comprising a cylinder element, an abutment element seated within said cylinder element and having abutment flanges extending therefrom, a piston extending into said cylinder element and having vanes for operation between said abutments, said piston and abutments defining hydraulic working chambers in which hydraulic fluid is displaced upon oscillation of said vanes, a flow passageway through one of said abutment flanges for flow of displaced hydraulic fluid, said abutment having a cylindrical recess extending radially thereinto from its outer side to be interposed in said passageway, an annular flange extending outwardly from the side of the cylinder element to provide an opening in alignment with said recess, a cylindrical valve housing extending from the exterior of the shock absorber through said opening and into said recess and having a bore therethrough providing a valve chamber at its inner end, a stem extending into said bore and terminating in a valve in said valve chamber, passageway through said housing for connecting said valve chamber with said flow passageway, said valve stem having threaded engagement in said bore for adjustment of the valve from the exterior of the shock absorber for metering the flow through said flow passageway, and packing and a packing gland in the outer end of said flange opening for sealing against the escape of hydraulic fluid.

2. A hydraulic shock absorber structure of the rotary type comprising a cylinder element, an abutment element seated within said cylinder element and having abutment flanges extending therefrom, a piston extending into said cylinder element and having vanes for operation between said abutments, said piston and abutments defining hydraulic working chambers in which hydraulic fluid is displaced upon oscillation of said vanes, a flow passageway through one of said abutment flanges for flow of displaced hydraulic fluid, said abutment having a cylindrical recess extending radially thereinto from its outer side to be interposed in said passageway, an annular flange extending outwardly from the side of the cylinder element to provide an opening in alignment with said recess, a cylindrical valve housing extending from the exterior of the shock absorber through said opening and into said recess and having a bore therethrough providing a valve chamber at its inner end, a stem extending into said bore and terminating in a valve in said valve chamber, passageway through said housing for connecting said valve chamber with said flow passageway, said valve stem having threaded engagement in said bore for adjustment of the valve from the exterior of the shock absorber for metering the flow through said flow passageway, a packing gland in the outer end of said opening, the inner diameter of said opening and that of the packing gland being somewhat larger than the outer diameter of the valve housing whereby to leave sufficient clearance to compensate for eccentricity in the machining operation for the recess and said opening, and packing material held by said gland around said valve housing to prevent leakage of hydraulic fluid to the exterior of the shock absorber.

3. In a hydraulic shock absorber of the rotary type in which a vaned piston operates between abutments in a cylinder element for displacement of hydraulic fluid and in which the piston is provided with flow passageways for flow of the displaced fluid between work chambers between said abutments, a blow off valve assembly extending axially in said piston structure and functioning to hold said passageways closed against any flow under normal pressure and to open only under abnormal high pressure, a normal flow passageway through one of said abutments and a valve chamber in said abutment interposed in said normal flow passageway, a valve in said valve chamber for controlling said flow passageway, the wall of the cylinder element having a passageway to the exterior adjacent to said valve chamber, and a stem extending from said valve through said cylinder wall opening to the exterior, said normal flow controlling valve and said blow off valve assembly being independently adjustable from the exterior of the shock absorber.

4. In a hydraulic shock absorber of the type disclosed in which a cylinder element and a separately formed abutment element defines hydraulic working chambers in which a piston structure is oscillatable for displacement of the fluid between working chambers, an abutment having a passageway therethrough for connecting the working chambers and a radially extending cylindrical recess interposed in said passageway, a boss on the outer side of the cylinder element having a bore therethrough leading to said recess, a valving assembly for said passageway comprising a tubular housing extending through said bore and into said recess and defining a valve chamber at its inner end for inclusion in said passageway, a valve stem extending through said housing and terminating in a valve in said valve chamber for controlling the flow through said passageway, said bore being of larger diameter than said housing whereby to provide clearance to compensate for eccentricity of the separate machining operations for said recess and said bore, and a packing assembly in said bore for preventing leakage to the exterior through said clearance.

5. In combination in a hydraulic shock absorber including a piston and a cylinder structure cooperatively related for relative movement in the operation of the shock absorber, valve structure carried by the piston and adjustable from the exterior of the shock absorber, said piston-carried valve structure being responsive to predetermined excess or abnormal pressure differential between hydraulic working chambers in the shock absorber for release of such pressure, and other valve structure separate from said piston-carried valve structure and adjustable from the exterior of the shock absorber, said other valve structure being constructed and arranged for metering the flow of hydraulic fluid displaced between the working chambers in the normal operation of the shock absorber.

6. In combination in a hydraulic shock absorber including a piston structure and a cylinder structure, valve means carried by the piston structure, valve means carried by the cylinder structure separate from said first mentioned valve means, one of said valve means being adapted for metering flow of displaced hydraulic fluid during normal operation of the shock absorber and the other valve means being adapted to respond to predetermined excess hydraulic fluid pressure for relief of such pressure, and means located for ready accessibility, externally of the cylinder structure for independently adjusting said respective valve means.

7. In combination in a hydraulic shock absorber of the rotary type in which a vaned piston operates between abutments in a cylinder structure for displacement of hydraulic fluid and in which the piston is provided with flow passageways for flow of the displaced fluid between work chambers defined by said abutment and the piston vanes cooperatively related, a normal flow passageway through one of said abutments, valve structure in said normal flow passageway for metering the flow therethrough and having adjustment means exteriorly of the shock absorber at one side of the cylinder, and blow-off valve structure carried by said piston and controlling the flow passageways therein to maintain the latter closed against hydraulic fluid flow under normal pressure but responsive to abnormally high pressures to open such passageway to afford momentary pressure relief until normal operating conditions again prevail, said piston-carried blow-off valve structure including adjustment means extending to the outer end of the piston for adjusting the pressure responsiveness thereof.

8. A hydraulic shock absorber structure of the rotary type comprising a cylinder structure, an abutment flange within said cylinder structure, a rotary vane piston extending into said cylinder structure and cooperating with said abutment flange to define hydraulic working chambers in which hydraulic fluid is displaced upon oscillation of said piston, a flow passageway through said abutment flange for flow of displaced hydraulic fluid, said abutment flange having a recess extending thereinto from its outer side, an opening in the cylinder structure generally aligned with said recess, a valve structure extending from the exterior of the cylinder structure through said opening into said recess for metering the flow of fluid through said passageway and including a cylinder member extending freely through said opening and secured to the abutment element within said recess and a valve stem element rotatably operable in said cylinder member, the diameter of said opening being somewhat larger than the outer diameter of said valve cylinder member to allow for eccentricity of machining of said recess and said opening, and sealing means in said opening surrounding said cylinder member to prevent leakage of hydraulic fluid to the exterior of the opening.

GERVASE M. MAGRUM.
BERNARD E. O'CONNOR.

REFERENCES CITED

The following references are of record in the file of this patent:

UNITED STATES PATENTS

| Number | Name | Date |
|---|---|---|
| 1,812,519 | Eckhard | June 30, 1931 |
| 1,820,971 | Gruenfeldt | Sept. 1, 1931 |
| 1,831,141 | Rossman | Nov. 10, 1931 |
| 1,932,770 | Crowe | Oct. 31, 1933 |
| 1,936,695 | Thayer | Nov. 28, 1933 |
| 2,087,548 | Pitt | July 20, 1937 |
| 2,286,290 | Magrum | June 16, 1942 |

FOREIGN PATENTS

| Number | Country | Date |
|---|---|---|
| 27,550 | France | July 28, 1924 |
| 494,658 | Germany | Mar. 31, 1930 |